United States Patent
Huang

(10) Patent No.: US 9,036,240 B2
(45) Date of Patent: May 19, 2015

(54) ELECTRONIC PAPER DISPLAY

(71) Applicant: Wistron Corp., New Taipei (TW)

(72) Inventor: Sheng-Shan Huang, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/071,550

(22) Filed: Nov. 4, 2013

(65) Prior Publication Data

US 2014/0126040 A1     May 8, 2014

(30) Foreign Application Priority Data

Nov. 6, 2012 (TW) .............................. 101141089 A

(51) Int. Cl.
| | | |
|---|---|---|
| *G02F 1/03* | (2006.01) | |
| *G09G 3/20* | (2006.01) | |
| *F21V 7/04* | (2006.01) | |
| *G02F 1/167* | (2006.01) | |
| *G02F 1/1335* | (2006.01) | |
| *F21V 8/00* | (2006.01) | |
| *G02F 1/23* | (2006.01) | |

(52) U.S. Cl.
CPC ....... *G02F 1/167* (2013.01); *G02F 1/03* (2013.01); *G02F 1/1335* (2013.01); *G09G 3/20* (2013.01); *G02B 6/0018* (2013.01); *G02B 6/0011* (2013.01); *G02B 6/0023* (2013.01); *G02B 6/0016* (2013.01); *G02B 6/0055* (2013.01); *G02B 6/0061* (2013.01); *G02F 1/23* (2013.01); *F21V 7/04* (2013.01)

(58) Field of Classification Search
CPC .. G02B 6/0011; G02B 6/0015; G02B 6/0016; G02B 6/0018; G02B 6/0023; G02B 6/0028; G02B 6/0055; G02B 6/0061; G02B 6/0086; G02B 6/0088; F21V 7/04; F21V 7/048; F21V 7/05; F21V 11/00; F21V 13/00; F21V 14/00; F21V 14/003; G02F 1/03; G02F 1/1335; G02F 1/23; G09G 3/16; G09G 3/20
USPC .............. 359/245, 263, 296; 345/55, 84, 102, 345/176; 362/23.16, 600, 606, 608; 349/61, 349/62, 65
See application file for complete search history.

(56) References Cited

U.S. PATENT DOCUMENTS

| | | | | |
|---|---|---|---|---|
| 4,113,353 | A | * | 9/1978 | Matsushita .................... 359/636 |
| 6,028,649 | A | * | 2/2000 | Faris et al. ....................... 349/10 |
| 6,734,929 | B2 | * | 5/2004 | Sugiura et al. ................... 349/65 |

(Continued)

FOREIGN PATENT DOCUMENTS

| | | |
|---|---|---|
| TW | 573179 | 1/2004 |
| TW | 201205530 A | 2/2012 |

OTHER PUBLICATIONS

Taiwan Patent Office, Office Action, Patent Application Serial No. 101141,089, Oct. 20, 2014, Taiwan.

*Primary Examiner* — Loha Ben

(57) ABSTRACT

The disclosure provides an electronic paper display. The electronic paper display includes an electronic paper panel. A light guide plate is disposed on the electronic paper panel. The light guide plate has a first surface and a second surface opposite to the first surface. A conductive pattern structural layer is disposed on the light guide plate. A light source is disposed on a side of the light guide plate. The first surface of the light guide plate is a patterned surface. A light generated by the light source is reflected or scattered to the electronic paper panel by the patterned surface.

10 Claims, 4 Drawing Sheets

(56) References Cited

U.S. PATENT DOCUMENTS

| | | | |
|---|---|---|---|
| 6,791,760 B2 * | 9/2004 | Janeczko et al. | 359/630 |
| 7,023,418 B2 * | 4/2006 | Nakamura et al. | 345/102 |
| 7,750,886 B2 * | 7/2010 | Sampsell | 345/102 |
| 7,855,827 B2 * | 12/2010 | Xu et al. | 359/296 |
| 8,107,155 B2 * | 1/2012 | Bita et al. | 359/290 |
| 8,373,821 B2 * | 2/2013 | Sampsell et al. | 349/62 |
| 8,605,232 B2 * | 12/2013 | Qi et al. | 349/62 |
| 8,798,425 B2 * | 8/2014 | Bita et al. | 385/129 |
| 8,920,018 B2 * | 12/2014 | Huang et al. | 362/615 |
| 2012/0026106 A1 | 2/2012 | Chiu et al. | |

* cited by examiner

ELECTRONIC PAPER DISPLAY

CROSS REFERENCE TO RELATED APPLICATIONS

This Application claims priority of Taiwan Patent Application No. 101141089, filed on Nov. 6, 2012, the entirety of which is incorporated by reference herein.

BACKGROUND

1. Field

The present disclosure relates to an electronic paper display, and in particular, to an electronic paper display, which can meet all the requirements of the thickness, weight and cost thereof.

2. Description of the Related Art

An electronic paper display (EPD) requires no backlight and needs an environment light source, for example, natural light or lamplight, to facilitate users reading. Therefore, the EPD can not be used in a low illumination environment. Additionally, to meet general use of users, a mouse is not a suitable pointing device for the EPD. Also, a keyboard is not a suitable input device for the EPD. Accordingly, the currently used EPD is constructed by an electronic paper and a front light guide module, which comprises a light guide plate and a light source to facilitate users reading in a low illumination environment. Also, the EPD is designed as a handheld device which uses a touch input method as the main input method. However, the conventional EPD still can not meet all the requirements of transmittance, contract, weight, thickness and fabrication cost thereof.

Thus, a novel electronic paper display to solve problems occurring in the conventional electronic paper display is desired.

SUMMARY

An electronic paper display is provided. An exemplary embodiment of an electronic paper display comprises an electronic paper panel. A light guide plate is disposed on the electronic paper panel, having a first surface away from the electronic paper panel and a second surface opposite to the first surface. A conductive pattern structural layer is disposed on the light guide plate. A light source is disposed on a side of the light guide plate, wherein the first surface of the light guide plate is a patterned surface, thereby a light generated by the light source is reflected or scattered to the electronic paper panel by the patterned surface.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

Figure 1:
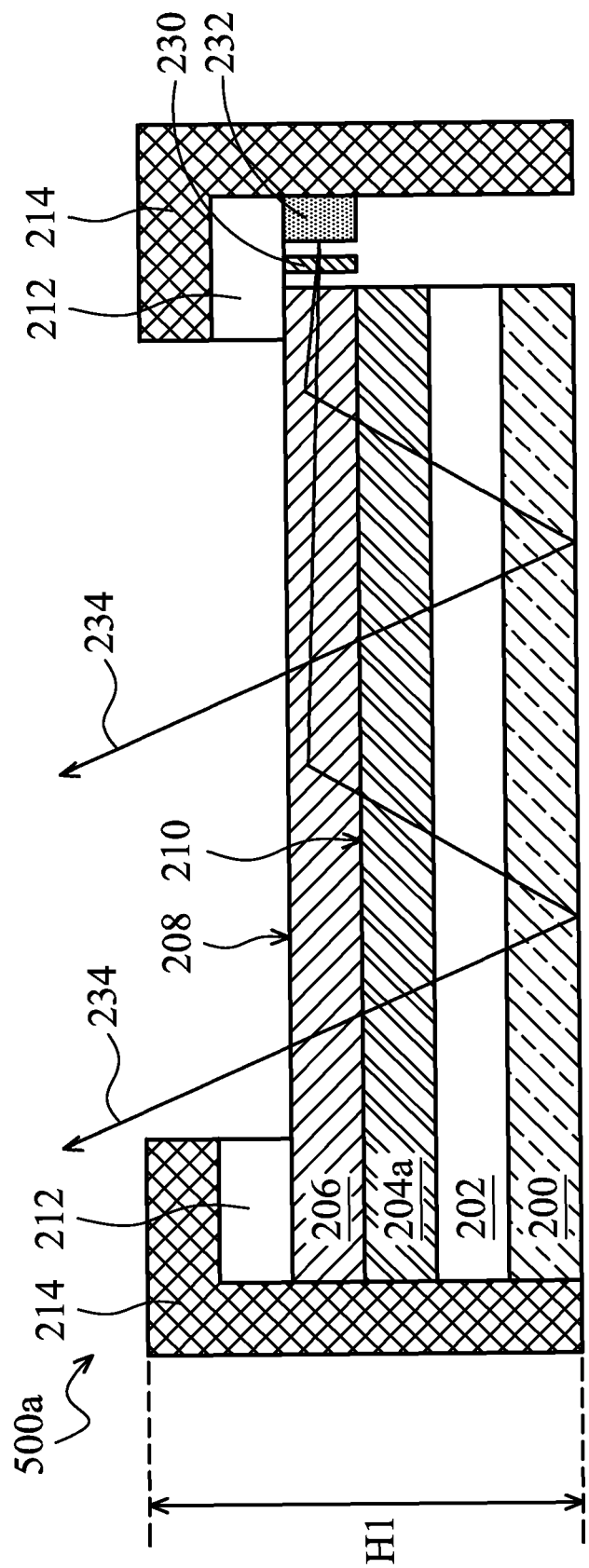
FIG. 1 is a cross sectional view showing one exemplary embodiment of an electronic paper display of the invention.

The following description is of a mode for carrying out the disclosure. This description is made for the purpose of illustrating the general principles of the disclosure and should not be taken in a limiting sense. The scope of the disclosure is best determined by reference to the appended claims. Wherever possible, the same reference numbers are used in the drawings and the descriptions to refer the same or like parts.

Embodiments provide an electronic paper display by integrating a front light guide module and a touch panel to reduce the total height, total weight, process sequence and fabrication cost of the electronic paper display. FIG. 1 is a cross sectional view showing one exemplary embodiment of an electronic paper display 500a of the disclosure. As shown in FIG. 1, the electronic paper display 500a may include an electronic paper panel 200 surrounded by a front frame 214, a light guide plate 206, a conductive pattern structural layer 204a, a diffusion plate 230 and a light source 232. In one embodiment, the electronic paper panel 200 may include a reflective panel, for example, an electro-phoretic display (EPD) panel or a cholesteric liquid crystal display (CLCD) panel. As shown in FIG. 1, the light guide plate 206 is disposed on the electronic paper panel 200. Also, the light guide plate 206 may be fixed in the front frame 214 by an adhesion layer 212. The light guide plate 206 has a first surface 208, which is away from the electronic paper panel 200, and a second surface 210 opposite to the first surface 208. In one embodiment, the light guide plate 206 may be formed of a glass or plastic. Additionally, in one embodiment, an optical texture treatment may be performed on the first surface 208 away from the electronic paper panel 200 (or the second surface 210) of the light guide plate 206. For example, the first surface 208 or the second surface 210 may be transformed into a patterned surface by printing a reflective ink or attaching a scattering plate (not shown) on the first surface 208 or the second surface 210. Alternatively, he first surface 208 or the second surface 210 may be transformed into a patterned surface by performing a chemical etching process or a laser etching process on the first surface 208 or the second surface 210. The electronic paper panel 200 may further comprise a light source 232 and a diffusion plate 230. In one embodiment, the light source 232 may be disposed on one side of the light guide plate 206 to provide a light 234 incident into the light guide plate 206. In another embodiment, the light source 232 may be disposed below the light guide plate 206, such that a light (not shown) emitted from the light source 232 can be reflected into the light guide plate 206. In one embodiment, the diffusion plate 230 may be disposed on one side of the light guide plate 206, laterally between the light source 232 and the light guide plate 206. The diffusion plate 230 is used to diffuse the light 234 emitted from the light source 232, such that the light 234 can be uniformly incident into the light guide plate 206. In another embodiment, the diffusion plate 230 may be fabricated on the side of the light guide plate 206. The light guide plate 206, the light source 232, and the diffusion plate 230 as shown in FIG. 1 may be collectively referred to as a front light guide module. Additionally, because the first surface 208 or the second surface 210 of the light guide plate 206 is a patterned surface, the light 234 can be reflected or scattered to the electronic paper panel 200 by the patterned surface (the first surface 208).

As shown in FIG. 1, a conductive pattern structural layer 204a is disposed on the light guide plate 206. In one embodiment, the conductive pattern structural layer 204a may comprise sensing electrode pattern structures of resistive or capacitive touch panels. The conductive pattern structural layer 204a may be formed of indium tin oxide (ITO), indium zinc oxide (IZO), Ga doped zinc oxide (GZO), Al-doped ZnO (AZO), zinc (Zn), conductive polymer (such as PEDOT), carbon nanotube film, silver (Ag) nano-line, metal wire mesh, graphite or the like. In this embodiment, the conductive pattern structural layer 204a is disposed directly on the second surface 210 of the light guide plate 206 by a sputtering or attaching method. Also, the conductive pattern structural layer 204a is disposed between the light guide plate 206 and the electronic paper panel 200. In this embodiment, the conductive pattern structural layer 204a may be a single layer, comprising vertical (column) sensing electrode patterns and horizontal (row) sensing electrode patterns. The vertical (column) sensing electrode patterns and horizontal (row) sensing electrode patterns are arranged alternatively and isolated from each other. Additionally, an optical glue 202 (such as optical clear adhesive (OCA) fabricated by Hitachi Chemical Co., Ltd) may be optionally disposed between the conductive pattern structural layer 204a and the electronic paper panel 200.

In one embodiment as shown in FIG. 1, the light guide plate 206 of the electronic paper display 500a may also serve as a cover lens of the touch panel. Therefore, the light guide plate 206 and the conductive pattern structural layer 204a disposed on the light guide plate 206 may be collectively constructed as a touch panel of a one glass solution (OGS) capacitive touch panel. Compared with the conventional electronic paper display fabricated by the OGS capacitive touch panel, one exemplary embodiment of the electronic paper display 500a is fabricated without requiring a cover lens, an optical glue to adhere the cover lens to the light guide plate and an anti-glare film (AG film) used in the conventional electronic paper display. Therefore, a total thickness H1 of the electronic paper display 500a is less than that of the conventional electronic paper display fabricated by the OGS capacitive touch panel. Also, the difference between the total thicknesses of the electronic paper display 500a and the conventional electronic paper display fabricated by the OGS capacitive touch panel is the thicknesses of the cover lens, the optical glue and the AG film of the conventional electronic paper display. Further, the processes of the cover lens, the optical glue and the AG film of the conventional electronic paper display are not required during the fabrication of the electronic paper display 500a with consideration to the transmittance, contract, weight and cost thereof.

Figure 2:
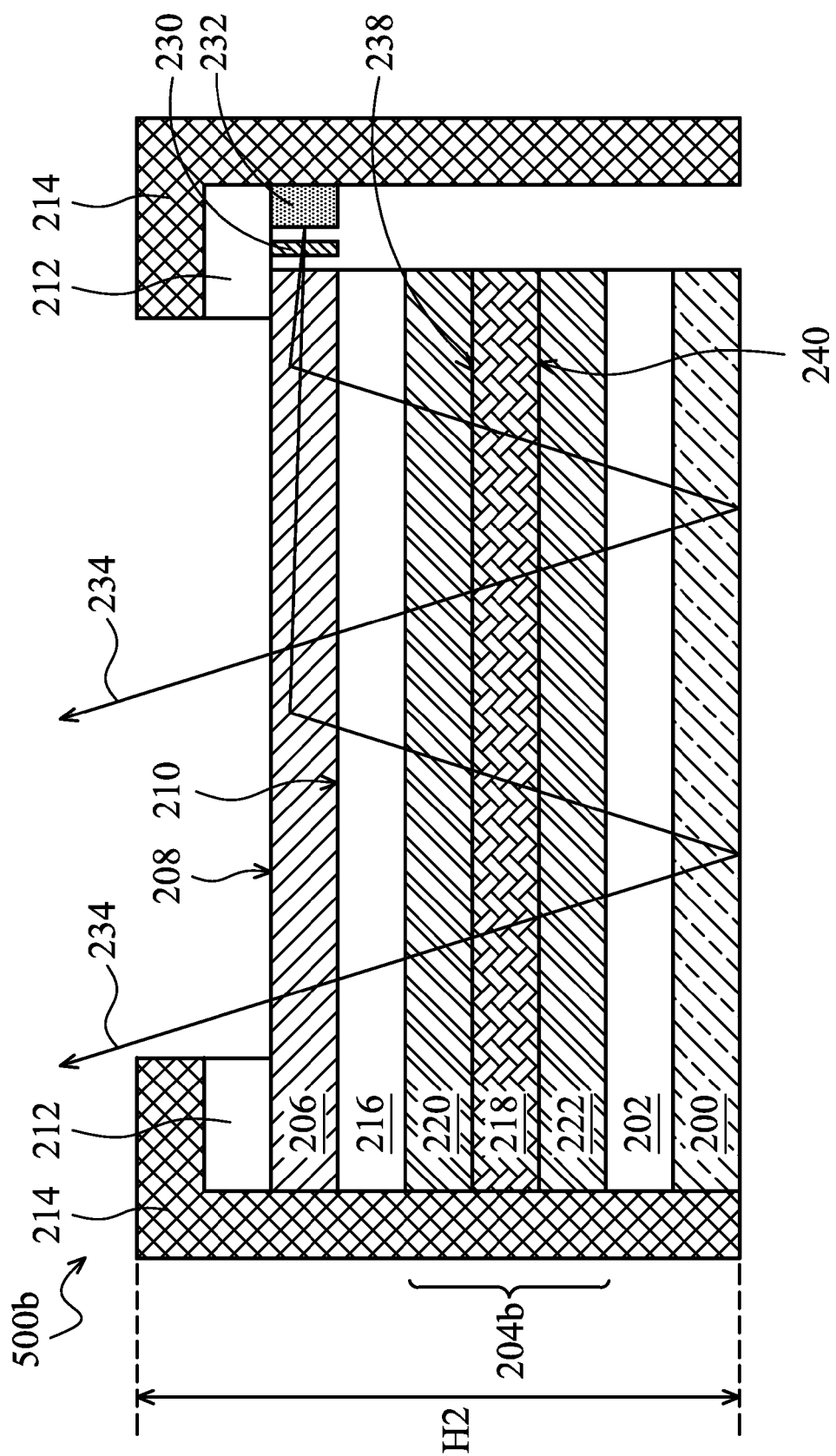
FIG. 2 is a cross sectional view showing another exemplary embodiment of an electronic paper display of the invention.

The conductive pattern structural layer can be firstly sputtered on a film, and then attached to the second surface 210 of the light guide plate 206 to prevent the conductive pattern structural layer from being damaged during the process of sputtering the conductive pattern structural layer on the light guide plate 206. FIG. 2 is a cross sectional view showing another exemplary embodiment of an electronic paper display 500b of the disclosure. A difference between the electronic paper displays 500a and 500b is that a conductive pattern structural layer 204b and a light guide plate 206 of the electronic paper display 500b can be collectively constructed to form a touch panel of a double side ITO (D-ITO) projective capacitive touch panel (also referred to as a G/F2 D-ITO projective capacitive touch panel). The light guide plate 206 may also serve as a cover lens of the touch panel. In this embodiment, the conductive pattern structural layer 204b comprises a substrate 218, an upper conductive pattern layer 220 and a lower conductive pattern layer 222. In one embodiment, the substrate 218 may comprise a glass, polycarbonates (PC), poly(vinyl chloride) (PVC) or poly(methyl methacrylate) (PMMA). Alternatively, the substrate 218 may also comprise an ITO-PET film or an ITO-plastic plate. As shown in FIG. 2, the substrate 218 has an upper surface 238 and a lower surface 240. Also, the upper conductive pattern layer 220 and the lower conductive pattern layer 222 may be respectively formed on the upper surface 238 and the lower surface 240 by a sputtering or printing method. In one embodiment, the upper conductive pattern layer 220 and the lower conductive pattern layer 222 may be vertical (column) sensing electrode patterns and horizontal (row) sensing electrode patterns, respectively. In this embodiment, an optical glue 216 may be used to attach the conductive pattern structural layer 204b to the second surface 210 of the light guide plate 206. In this embodiment, the upper conductive pattern layer 220 and the lower conductive pattern layer 222 may be formed of indium tin oxide (ITO). Although the upper conductive pattern layer 220 and the lower conductive pattern layer 222 may be formed of indium zinc oxide (IZO), Ga doped zinc oxide (GZO), Al-doped ZnO (AZO), zinc, conductive polymer (such as PEDOT), carbon nanotube film, Ag nano-line, metal wire mesh or graphite. Compared with the conventional electronic paper display fabricated by the D-ITO projective capacitive touch panel, one exemplary embodiment of the electronic paper display 500b is fabricated without requiring a cover lens, an optical glue to adhere the cover lens to the light guide plate and an anti-glare film (AG film) is used in the conventional electronic paper display. Therefore, the total thickness H2 of the electronic paper display 500b is less than that of the conventional electronic paper display fabricated by the D-ITO projective capacitive touch panel. Also, the difference between the total thicknesses of the electronic paper display 500b and the conventional electronic paper display fabricated by the D-ITO projective capacitive touch panel is the thicknesses of the cover lens, the optical glue and the AG film of the conventional electronic paper display. Further, the processes of the cover lens, the optical glue and the AG film of the conventional electronic paper display are not required during the fabrication of the electronic paper display 500b with consideration to the transmittance, contract, weight and cost thereof.

Figure 3:
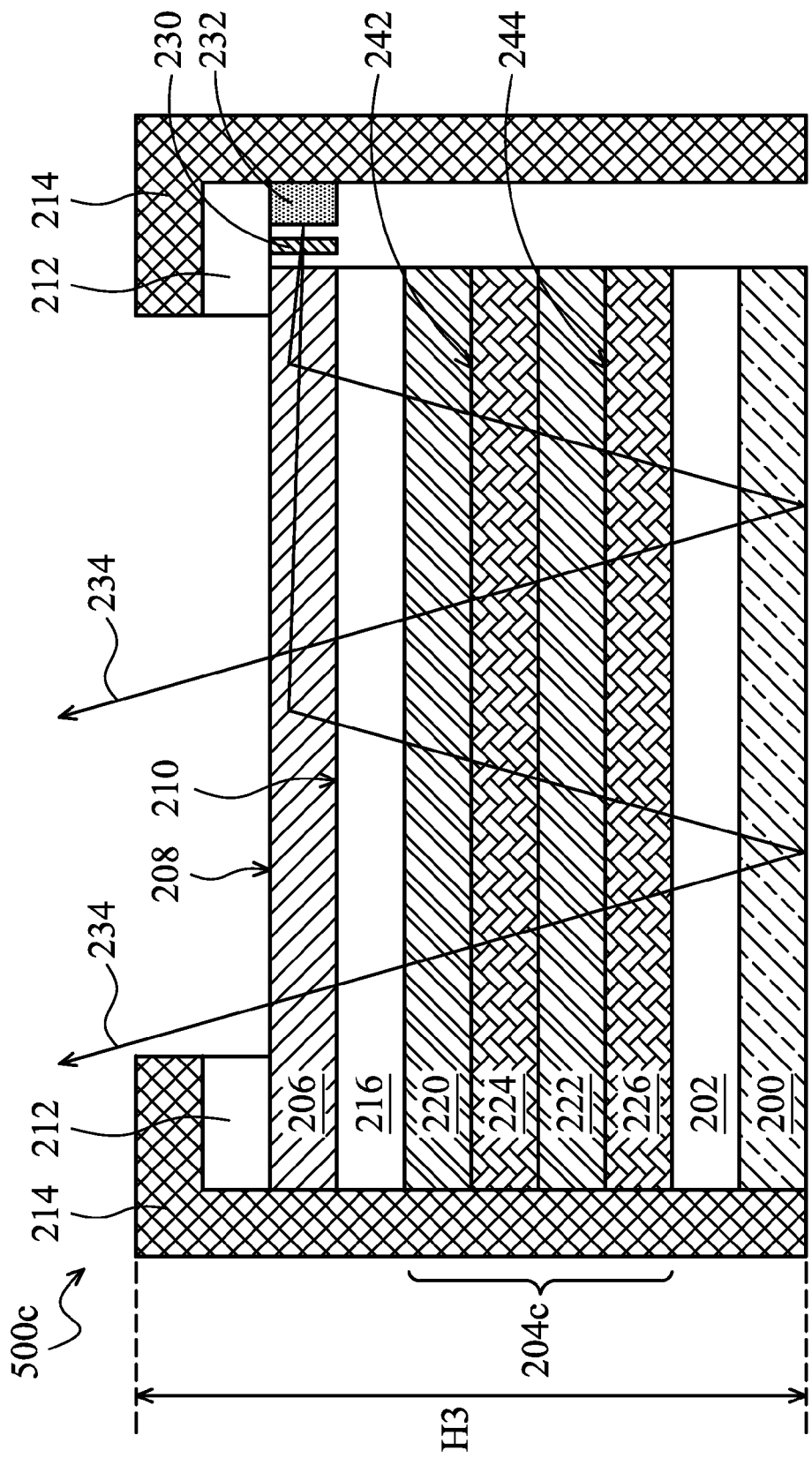
FIG. 3 is a cross sectional view showing yet another exemplary embodiment of an electronic paper display of the invention.

FIG. 3 is a cross sectional view showing yet another exemplary embodiment of an electronic paper display 500c of the disclosure. A difference between the electronic paper displays 500a and 500c is that a conductive pattern structural layer 204c and a light guide plate 206 of the electronic paper display 500c can be collectively constructed to form a touch panel of a single side ITO (S-ITO) projective capacitive touch panel (also referred to as a glass/ITO X film/ITO Y film (G/F/F) D-ITO projective capacitive touch panel). The light guide plate 206 may also serve as a cover lens of the touch panel. In this embodiment, the conductive pattern structural layer 204c comprises a first substrate 224, a second substrate 226, an upper conductive pattern layer 220 and a lower conductive pattern layer 222. In one embodiment, the first substrate 224 and the second substrate 226 may comprise a glass, polycarbonates (PC), poly(vinyl chloride) (PVC) or poly(methyl methacrylate) (PMMA). Alternatively, the substrate 218 may also comprise ITO-PET film or ITO-plastic. As shown in FIG. 3, the upper conductive pattern layer 220 and the lower conductive pattern layer 222 may be respectively formed on an upper surface 242 of the first substrate 224 and an upper surface 244 of the second substrate 226 by a sputtering or printing method. Alternatively, the first substrate 224 used to carry the upper conductive pattern layer 220 and the second substrate 226 used to carry the lower conductive pattern layer 222 may be formed by performing a patterning process on an ITO-PET film or an ITO-plastic plate with a conductive material coating thereon. Also, the first substrate 224 used to carry the upper conductive pattern layer 220 may be connected to the second substrate 226 used to carry the lower conductive pattern layer 222 by a laminating method. In one embodiment, the upper conductive pattern layer 220 and the lower conductive pattern layer 222 may be vertical (column) sensing electrode patterns and horizontal (row) sensing electrode patterns, respectively. In this embodiment, an optical glue 216 may be used to attach the conductive pattern structural layer 204c to the second surface 210 of the light guide plate 206. In this embodiment, the upper conductive pattern layer 220 and the lower conductive pattern layer 222 may be formed of indium tin oxide (ITO). Although the upper conductive pattern layer 220 and the lower conductive pattern layer 222 may be formed of indium zinc oxide (IZO), Ga doped zinc oxide (GZO), Al-doped ZnO (AZO), zinc, conductive polymer (such as PEDOT), carbon nanotube film, Ag nano-line, metal wire mesh or graphite. Compared with the conventional electronic paper display fabricated by the S-ITO projective capacitive touch panel, one exemplary embodiment of the electronic paper display 500c is fabricated without requiring a cover lens, an optical glue to adhere the cover lens to the light guide plate and an anti-glare film (AG film) used in the conventional electronic paper display. Therefore, the total thickness H3 of the electronic paper display 500c is less than that of the conventional electronic paper display fabricated by the S-ITO projective capacitive touch panel. Also, the difference between the total thicknesses of the electronic paper display 500c and the conventional electronic paper display fabricated by the S-ITO projective capacitive touch panel is the thicknesses of the cover lens, the optical glue and the AG film of the conventional electronic paper display. Further, the processes of the cover lens, the optical glue and the AG film of the conventional electronic paper display are not required during the fabrication of the electronic paper display 500c with consideration to the transmittance, contract, weight and cost thereof.

Figure 4:
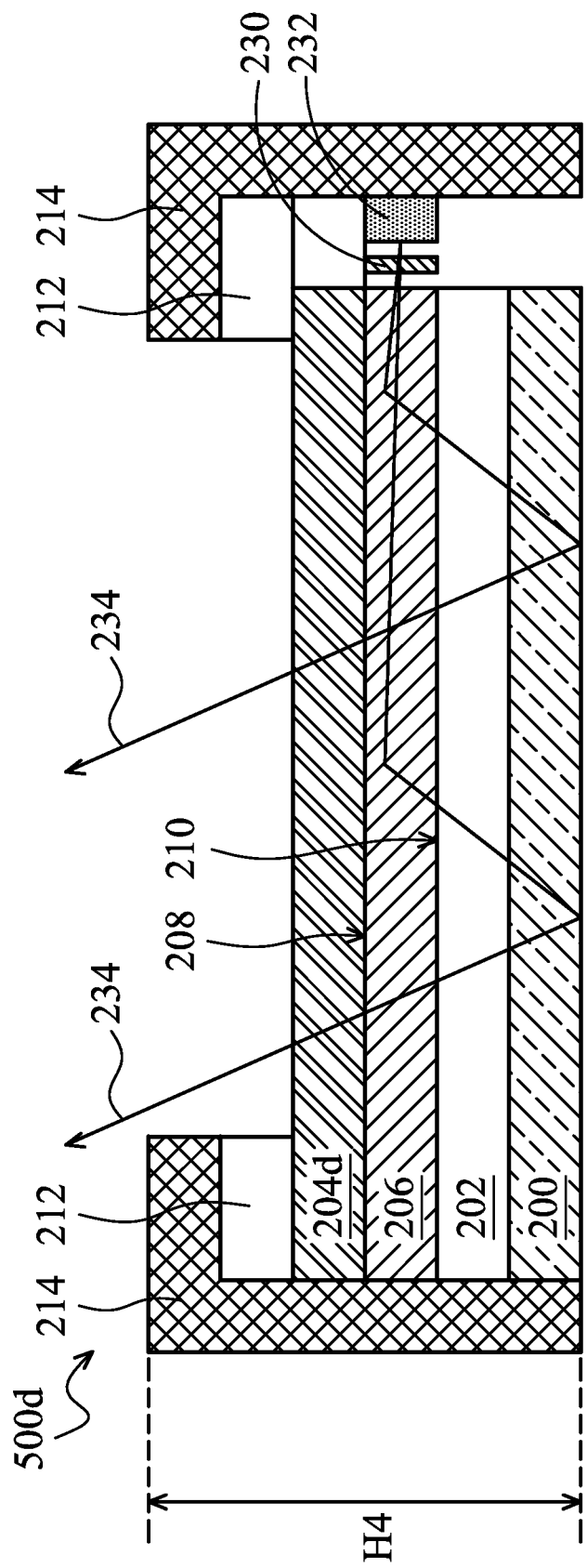
FIG. 4 is a cross sectional view showing still another exemplary embodiment of an electronic paper display of the invention.

FIG. 4 is a cross sectional view showing still another exemplary embodiment of an electronic paper display 500d of the disclosure. As shown in FIG. 4, in still another exemplary embodiment, a conductive pattern structural layer 204d of the electronic paper display 500d may be also disposed on a patterned first surface 208 of a light guide plate 206. The conductive pattern structural layer 204d and a light guide plate 206 of the electronic paper display 500d can be collectively constructed to form a touch panel of a surface capacitive touch (SCT) panel. In this embodiment, the conductive pattern structural layer 204d is disposed directly on the second surface 210 of the light guide plate 206 by a sputtering or attaching method. Therefore, the light guide plate 206 is disposed between the conductive pattern structural layer 204d and the electronic paper panel 200. Also, the conductive pattern structural layer 204d is fixed in a front frame 214 through an adhesion layer 212. In this embodiment, the conductive pattern structural layer 204d is a single layer, sensing an electrical potential difference by four corner electrodes. Additionally, the conductive pattern structural layer 204d may be formed from the same materials as the conductive pattern structural layers 204a~204c. Compared with the conventional electronic paper display fabricated by the SCT panel, one exemplary embodiment of the electronic paper display 500d is fabricated without requiring a cover lens, an optical glue to adhere the cover lens to the light guide plate and an anti-glare film (AG film) used in the conventional electronic paper display. Therefore, the total thickness H4 of the electronic paper display 500d is less than that of the conventional electronic paper display fabricated by the SCT panel. Also, the difference between the total thicknesses of the electronic paper display 500d and the conventional electronic paper display fabricated by the SCT panel is the thicknesses of the cover lens, the optical glue and the AG film of the conventional electronic paper display. Further, the processes of the cover lens, the optical glue and the AG film of the conventional electronic paper display are not required during the fabrication of the electronic paper display 500d with considering the transmittance, contract, weight and cost thereof.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic paper display, comprising:
   an electronic paper panel;
   a light guide plate disposed on the electronic paper panel, wherein the light guide plate has a first surface away from the electronic paper panel and a second surface opposite to the first surface;
   a conductive pattern structural layer disposed on the light guide plate; and
   a light source disposed on a side of the light guide plate, wherein the first surface of the light guide plate is a patterned surface, thereby a light generated by the light source is reflected or scattered to the electronic paper panel by the patterned surface.

2. The electronic paper display as claimed in claim 1, wherein the conductive pattern structural layer is disposed on the first surface.

3. The electronic paper display as claimed in claim 1, wherein the conductive pattern structural layer is disposed on the second surface.

4. The electronic paper display as claimed in claim 3, wherein the conductive pattern structural layer comprises:
   a first substrate having an upper surface and a lower surface; and
   an upper conductive pattern layer and a lower conductive pattern layer disposed on the upper surface and the lower surface of the first substrate, respectively.

5. The electronic paper display as claimed in claim 4, further comprising:
   a second substrate disposed on the lower conductive pattern layer, thereby the lower conductive pattern layer is between the first substrate and the second substrate.

6. The electronic paper display as claimed in claim 1, wherein the patterned surface is formed by a method comprising printing a reflective ink, chemical etching or laser etching.

7. The electronic paper display as claimed in claim 1, wherein the light guide plate comprises a glass or plastic.

8. The electronic paper display as claimed in claim 1, wherein the conductive pattern structural layer is formed of indium tin oxide (ITO), indium zinc oxide (IZO), Ga doped zinc oxide (GZO), Al-doped ZnO (AZO), zinc (Zn), conductive polymer, carbon nanotube film, silver (Ag) nano-line or graphite.

9. The electronic paper display as claimed in claim 1, further comprising:
   a diffusion plate disposed between the light guide plate and the light source; and
   an optical glue disposed between the conductive pattern structural layer and the electronic paper panel.

10. The electronic paper display as claimed in claim 1, wherein the conductive pattern structural layer comprises a sensing electrode pattern structure for detecting touch input.

\* \* \* \* \*